(12) United States Patent
Ekberg et al.

(10) Patent No.: US 9,203,609 B2
(45) Date of Patent: Dec. 1, 2015

(54) METHOD AND APPARATUS FOR IMPLEMENTING KEY STREAM HIERARCHY

(75) Inventors: Jan-Erik Ekberg, Vantaa (FI); Jari-Jukka Harald Kaaja, Jarvenpaa (FI)

(73) Assignee: Nokia Technologies Oy, Espoo (FI)

( * ) Notice: Subject to any disclaimer, the term of this patent is extended or adjusted under 35 U.S.C. 154(b) by 288 days.

(21) Appl. No.: 13/316,932

(22) Filed: Dec. 12, 2011

(65) Prior Publication Data

US 2013/0148805 A1  Jun. 13, 2013

(51) Int. Cl.
*H04K 1/00*   (2006.01)
*H04L 9/06*   (2006.01)
*H04L 9/08*   (2006.01)

(52) U.S. Cl.
CPC .............. *H04L 9/065* (2013.01); *H04L 9/0838* (2013.01); *H04L 9/0877* (2013.01); *H04L 2209/805* (2013.01)

(58) Field of Classification Search
USPC .................................................. 380/260–270
See application file for complete search history.

(56) References Cited

U.S. PATENT DOCUMENTS

| 2004/0187001 | A1* | 9/2004 | Bousis ........................... 713/175 |
| 2005/0125670 | A1* | 6/2005 | Sozzani et al. ................. 713/171 |
| 2005/0147245 | A1* | 7/2005 | Hassan et al. .................... 380/44 |
| 2006/0062393 | A1* | 3/2006 | Hsu et al. ........................ 380/281 |
| 2007/0147618 | A1* | 6/2007 | Horn .............................. 380/277 |
| 2009/0296941 | A1* | 12/2009 | Devanand et al. ............. 380/281 |
| 2010/0001840 | A1* | 1/2010 | Kang et al. ..................... 340/10.1 |
| 2010/0034385 | A1* | 2/2010 | Gantman et al. ............... 380/268 |
| 2010/0067688 | A1* | 3/2010 | Au et al. ........................... 380/43 |
| 2011/0028091 | A1  | 2/2011 | Higgins et al. |
| 2011/0145590 | A1* | 6/2011 | Harada et al. .................. 713/185 |
| 2012/0155633 | A1* | 6/2012 | Wong et al. ....................... 380/28 |

FOREIGN PATENT DOCUMENTS

| EP | 1770900 A1 | 4/2007 |
| EP | 2228942 A1 | 9/2010 |
| GB | 2427055 | 12/2006 |

OTHER PUBLICATIONS

Halderman et al., Privacy Management for Portable Recording Devices, Copyright 2004 ACM, pp. 16-24.*
Yoon, Janghong, An Effective Resynchronization Method for Wireless Secure Sensor Network, 2006 IEEE, pp. 1-4.*

(Continued)

*Primary Examiner* — Roderick Tolentino
(74) *Attorney, Agent, or Firm* — Alston & Bird LLP

(57) ABSTRACT

Various methods for implementing keystream hierarchy in a distributed memory environment are provided. One example method may comprise causing a generated keystream to be accessed on a memory device, wherein the keystream was generated in an instance in which the memory device was in radio communications range. One example method may further comprise determining a session key based on the generated keystream and a modified keystream. In some example embodiments, the modified keystream is created by the memory device based on the generated keystream and a keystream received by the memory device from a second device. One example method may further comprise causing communications data to be transmitted to the memory device or to the second device. In some example embodiments, the communications data is protected using at least a portion of the session key and is intended for the second device.

17 Claims, 8 Drawing Sheets

(56) References Cited

OTHER PUBLICATIONS

Billet, O. et al.,*Lightwave Privacy Preserving Authentication for RFID Using a Stream Cipher*, Fast Software Encryption. Springer Berlin/Heidelberg, 2010 [retrieved on Feb. 25, 2013]. Retrieved from the Internet: URL:http://www.iacr.org/archive/fse2010/61470056/61470056.pdf.

International Search Report and Written Opinion for Application No. PCT/FI2012/051208 dated Mar. 14, 2013.

Handbook of Applied Cryptography 497-49; © 1997 by CRC Press, Inc.

European Search Report for Application No. EP 12 85 7821 dated Jul. 29, 2015.

\* cited by examiner

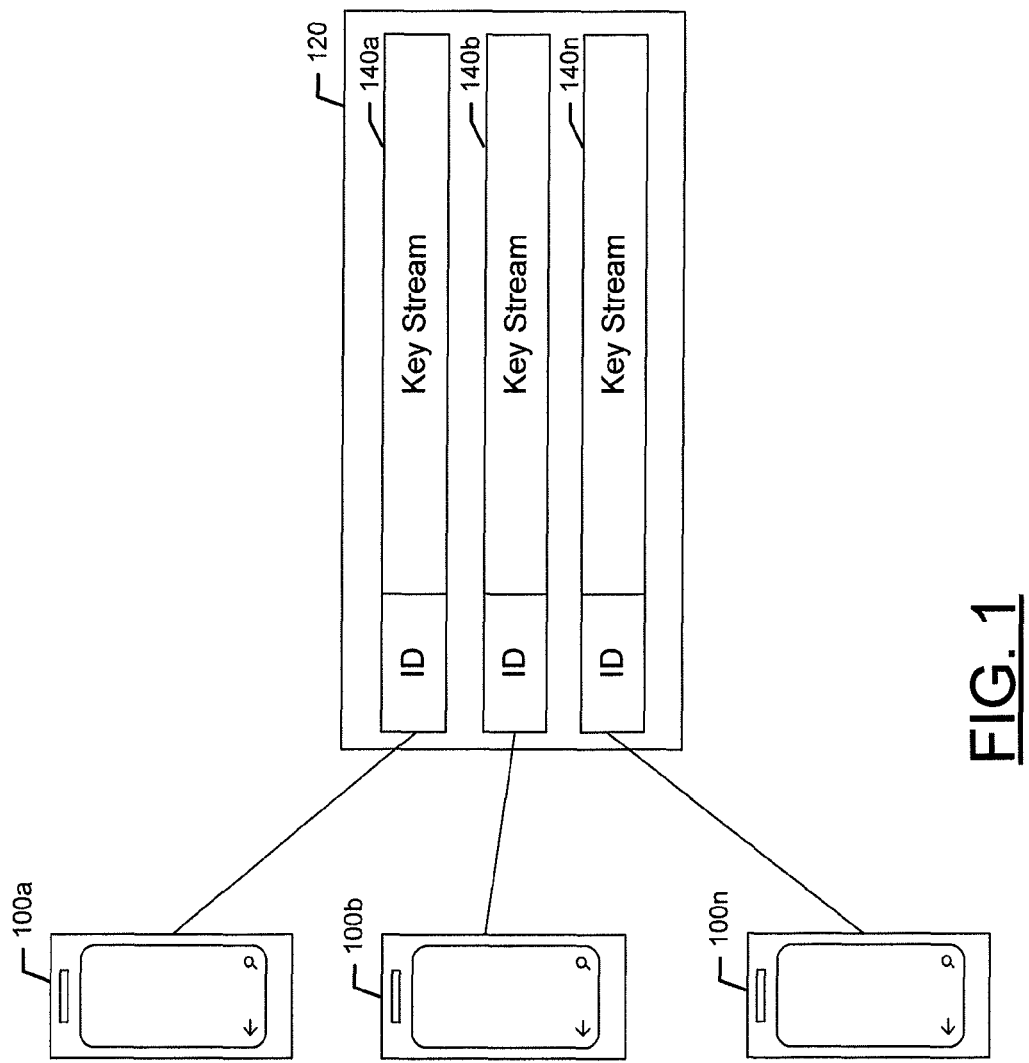

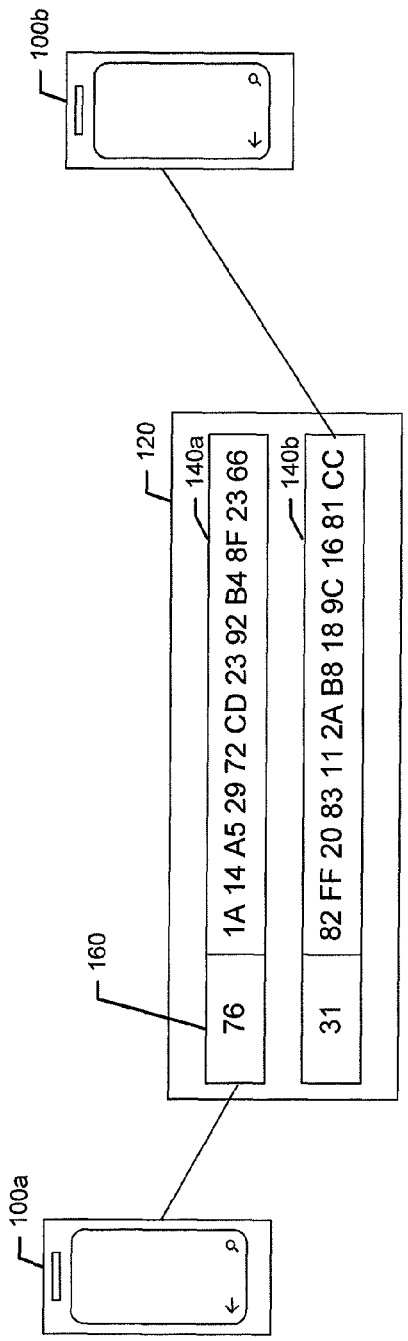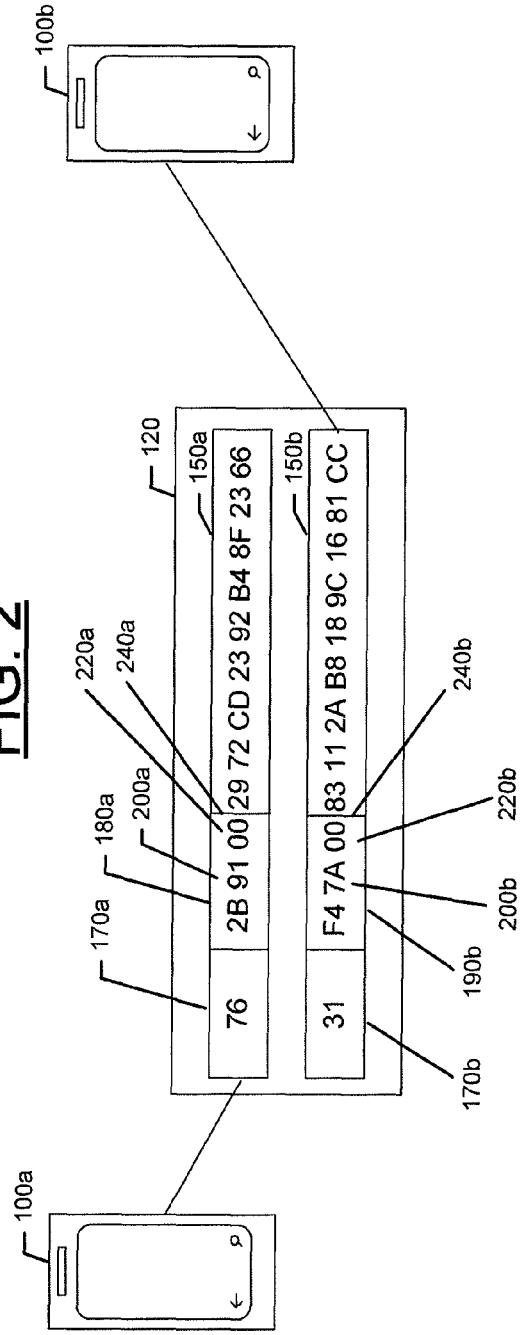

METHOD AND APPARATUS FOR IMPLEMENTING KEY STREAM HIERARCHY

TECHNICAL FIELD

Various embodiments relate generally to key agreement and security, and, more particularly, relate to a method and apparatus for implementing keystream hierarchy.

BACKGROUND

Mobile computing devices continue to become more powerful and dynamic with respect to high-speed communications techniques and powerful, yet compact, processing capabilities. Due to the demand for compact, handheld devices capable of performing complex computerized tasks and the increasing speeds of communications, the evolution of computing technology is moving towards leveraging distributed resources in the form of distributed data storage and computing capabilities, and being able to utilize local distributed content and connectivity effectively. Because access to these distributed resources is often shared with other devices (e.g., in a local domain), attention is paid to the reliability and security of data that is being handled by these resources and by various user devices.

SUMMARY

Example methods, example apparatuses, and example computer program products are described herein that enable keystream hierarchy e.g. in a distributed memory environment. Some example embodiments may be configured to enable distribution of generated key streams for one to one communications and/or group communications. The generated keystreams may be created and/or stored on a memory device (e.g. radio frequency (RF) memory tag, a Universal Serial Bus (USB) memory, active or passive embedded RF memory tag and/or a standalone RF memory tag). For example, the example methods, example apparatuses, and example computer program products are configured to generate a keystream for a communications device in an instance in which that communications device has come into contact with a memory device. The example keystream created by the communications device may be stored on the memory device along with other keystreams created for other communications devices. In some example embodiments, a session key may then be created based on two or more keystreams stored on the memory device. The example session key may be used to encrypt a communication and/or enable a communication to be stored on a memory device between communications devices.

In one embodiment, a method is provided that comprises causing a generated keystream to be accessed on a memory device. In some example embodiments the keystream was generated in an instance in which the memory device was in radio communications range. The method of this embodiment may also include determining a session key based on a generated keystream and a modified keystream. In some example embodiments the modified keystream is created by the memory device based on the generated keystream and a keystream received by the memory device from a second device. The method of this embodiment may also include causing communications data to be transmitted to the memory device or to the second device. In some example embodiments the communications data is protected using at least a portion of the session key and is intended for the second device.

In another embodiment, an apparatus is provided that includes at least one processor and at least one memory including computer program code with the at least one memory and the computer program code being configured, with the at least one processor, to cause the apparatus to at least cause a generated keystream to be accessed on a memory device. In some example embodiments the keystream was generated in an instance in which the memory device was in radio communications range. The at least one memory and computer program code may also be configured to, with the at least one processor, cause the apparatus to determine a session key based on a generated keystream and a modified keystream. In some example embodiments the modified keystream is created by the memory device based on the generated keystream and a keystream received by the memory device from a second device. The at least one memory and computer program code may also be configured to, with the at least one processor, cause the apparatus to cause communications data to be transmitted to the memory device or to the second device. In some example embodiments the communications data is protected using at least a portion of the session key and is intended for the second device.

In the further embodiment, a computer program product may be provided that includes at least one non-transitory computer-readable storage medium having computer-readable program instruction stored therein with the computer-readable program instructions including program instructions configured to cause a generated keystream to be accessed on a memory device. In some example embodiments the keystream was generated in an instance in which the memory device was in radio communications range. The computer-readable program instructions may also include program instructions configured to determine a session key based on a generated keystream and a modified keystream. In some example embodiments the modified keystream is created by the memory device based on the generated keystream and a keystream received by the memory device from a second device. The computer-readable program instructions may also include program instructions configured to cause communications data to be transmitted to the memory device or to the second device. In some example embodiments the communications data is protected using at least a portion of the session key and is intended for the second device.

In yet another embodiment, an apparatus is provided that includes means for causing a generated keystream to be accessed on a memory device. In some example embodiments the keystream was generated in an instance in which the memory device was in radio communications range. The apparatus of this embodiment may also include means for determining a session key based on a generated keystream and a modified keystream. In some example embodiments the modified keystream is created by the memory device based on the generated keystream and a keystream received by the memory device from a second device. The apparatus of this embodiment may also include means for causing communications data to be transmitted to the memory device or to the second device. In some example embodiments the communications data is protected using at least a portion of the session key and is intended for the second device.

In one embodiment, a method is provided that comprises receiving a first generated keystream in an instance in which a first device is in radio communications range. The method of this embodiment may also include receiving a second generated keystream in an instance in which a second device is in radio communications range. The method of this embodiment may also include generating a first modified keystream based on an identification indicator of the second device and the second generated keystream. The method of this embodiment may also include generating a second modified keystream based on an identification indicator of the first device and the first generated keystream.

In another embodiment, an apparatus is provided that includes at least one processor and at least one memory including computer program code with the at least one memory and the computer program code being configured, with the at least one processor, to cause the apparatus to at least receive a first generated keystream in an instance in which a first device is in radio communications range. The at least one memory and computer program code may also be configured to, with the at least one processor, cause the apparatus to receive a second generated keystream in an instance in which a second device is in radio communications range. The at least one memory and computer program code may also be configured to, with the at least one processor, cause the apparatus to generate a first modified keystream based on an identification indicator of the second device and the second generated keystream. The at least one memory and computer program code may also be configured to, with the at least one processor, cause the apparatus to generate a second modified keystream based on an identification indicator of the first device and the first generated keystream.

In the further embodiment, a computer program product may be provided that includes at least one non-transitory computer-readable storage medium having computer-readable program instruction stored therein with the computer-readable program instructions including program instructions configured to receive a first generated keystream in an instance in which a first device is in radio communications range. The computer-readable program instructions may also include program instructions configured to receive a second generated keystream in an instance in which a second device is in radio communications range. The computer-readable program instructions may also include program instructions configured to generate a first modified keystream based on an identification indicator of the second device and the second generated keystream. The computer-readable program instructions may also include program instructions configured to generate a second modified keystream based on an identification indicator of the first device and the first generated keystream.

In yet another embodiment, an apparatus is provided that includes means for receiving a first generated keystream in an instance in which a first device is in radio communications range. The apparatus of this embodiment may also include means for receiving a second generated keystream in an instance in which a second device is in radio communications range. The apparatus of this embodiment may also include means for generating a first modified keystream based on an identification indicator of the second device and the second generated keystream. The apparatus of this embodiment may also include means for generating a second modified keystream based on an identification indicator of the first device and the first generated keystream.

BRIEF DESCRIPTION OF THE DRAWINGS

Figure 4:
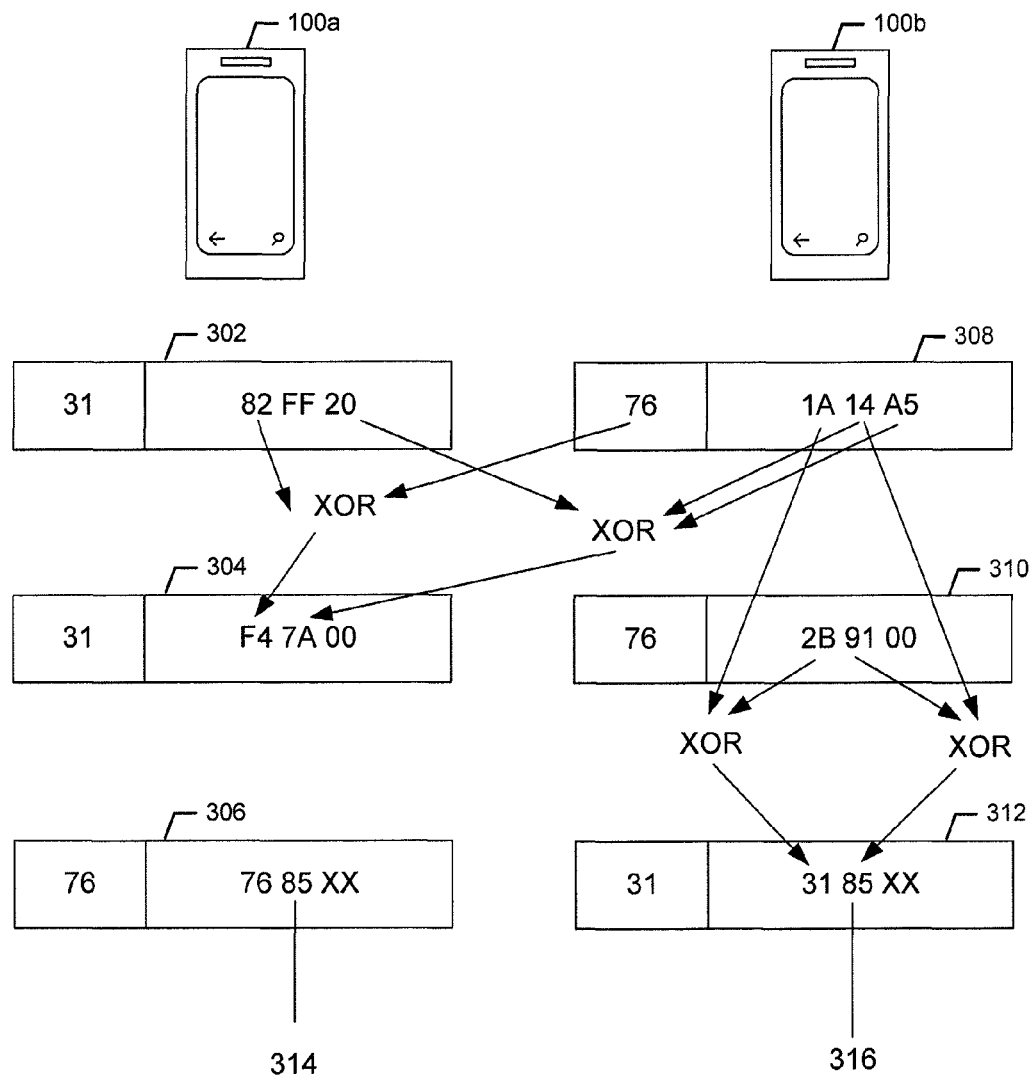
Figure 5:
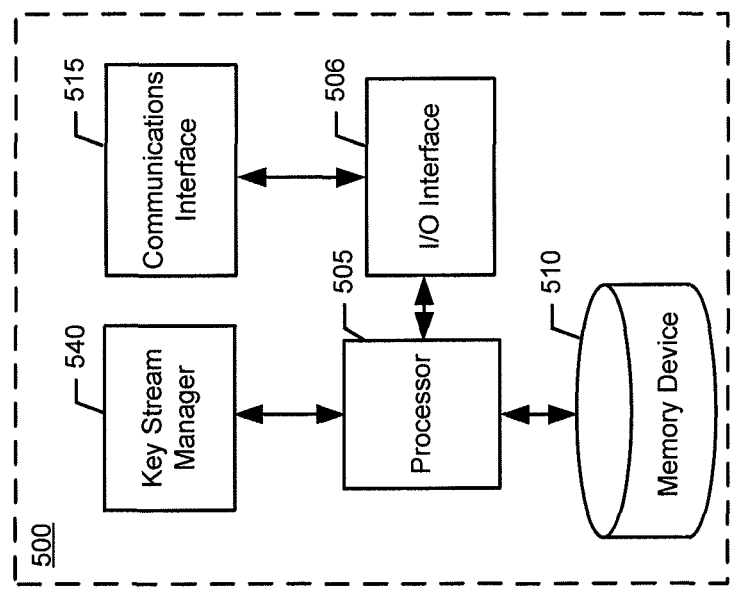
Figure 6:
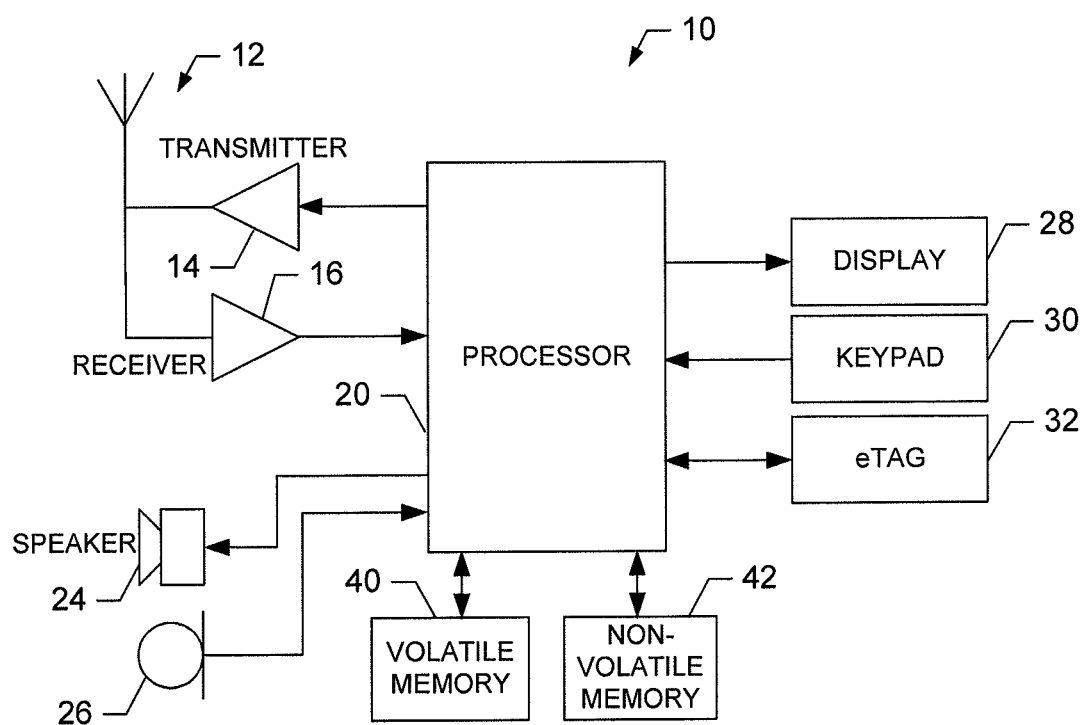
Figure 7:
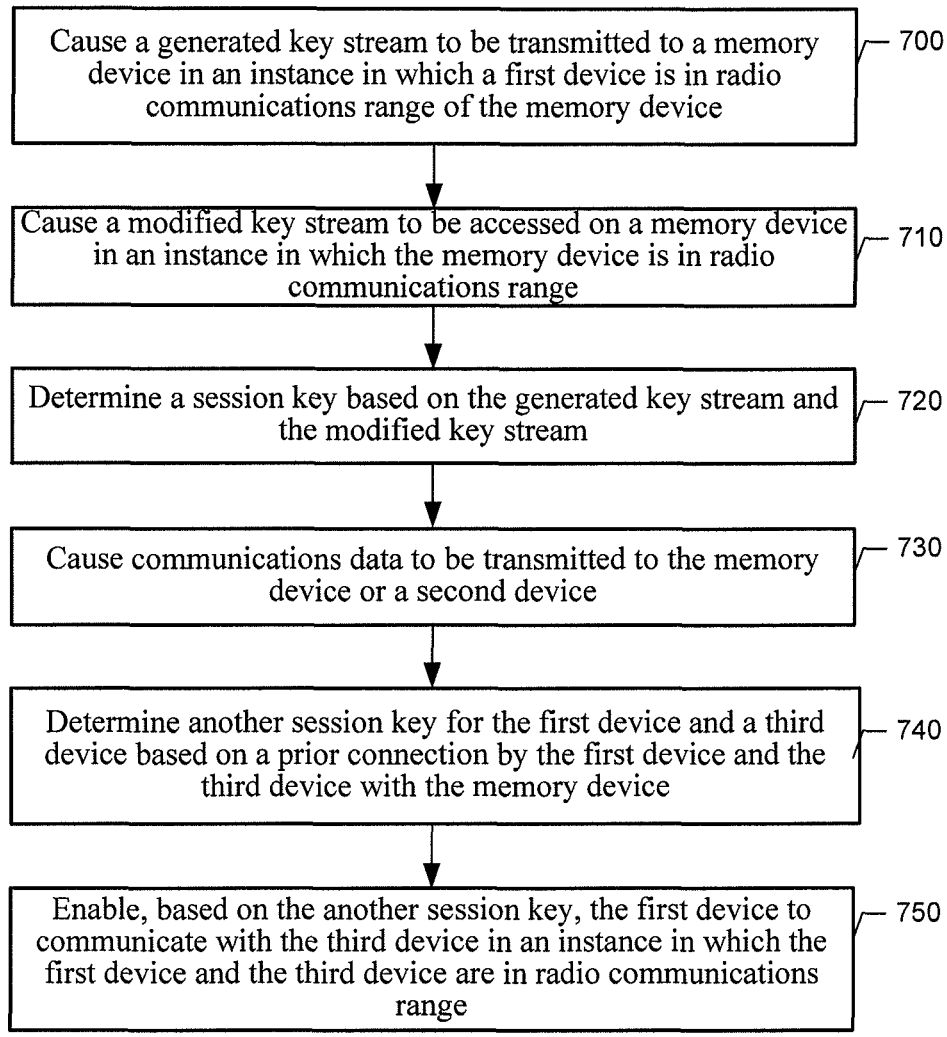
Figure 8:
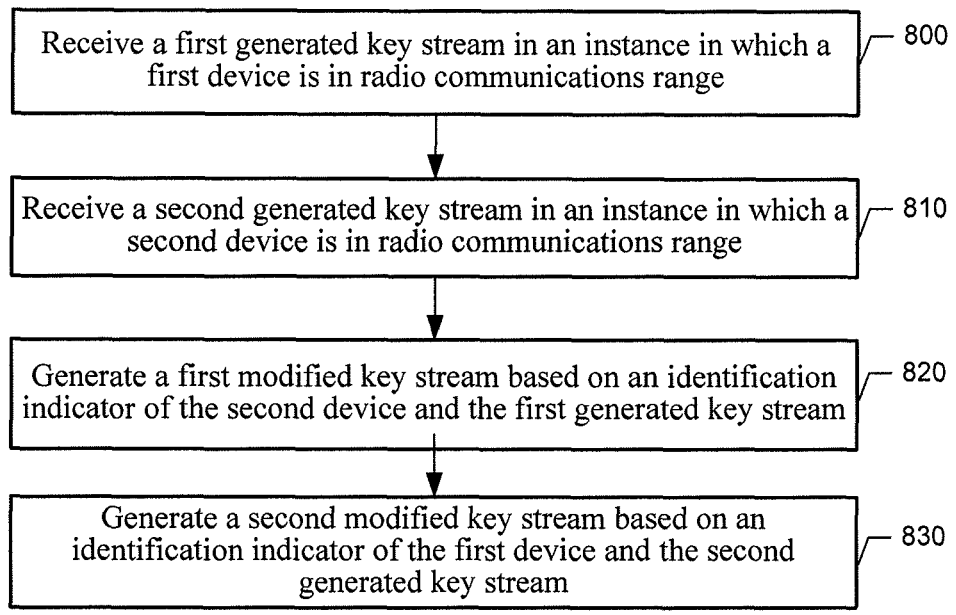
Figure 9:
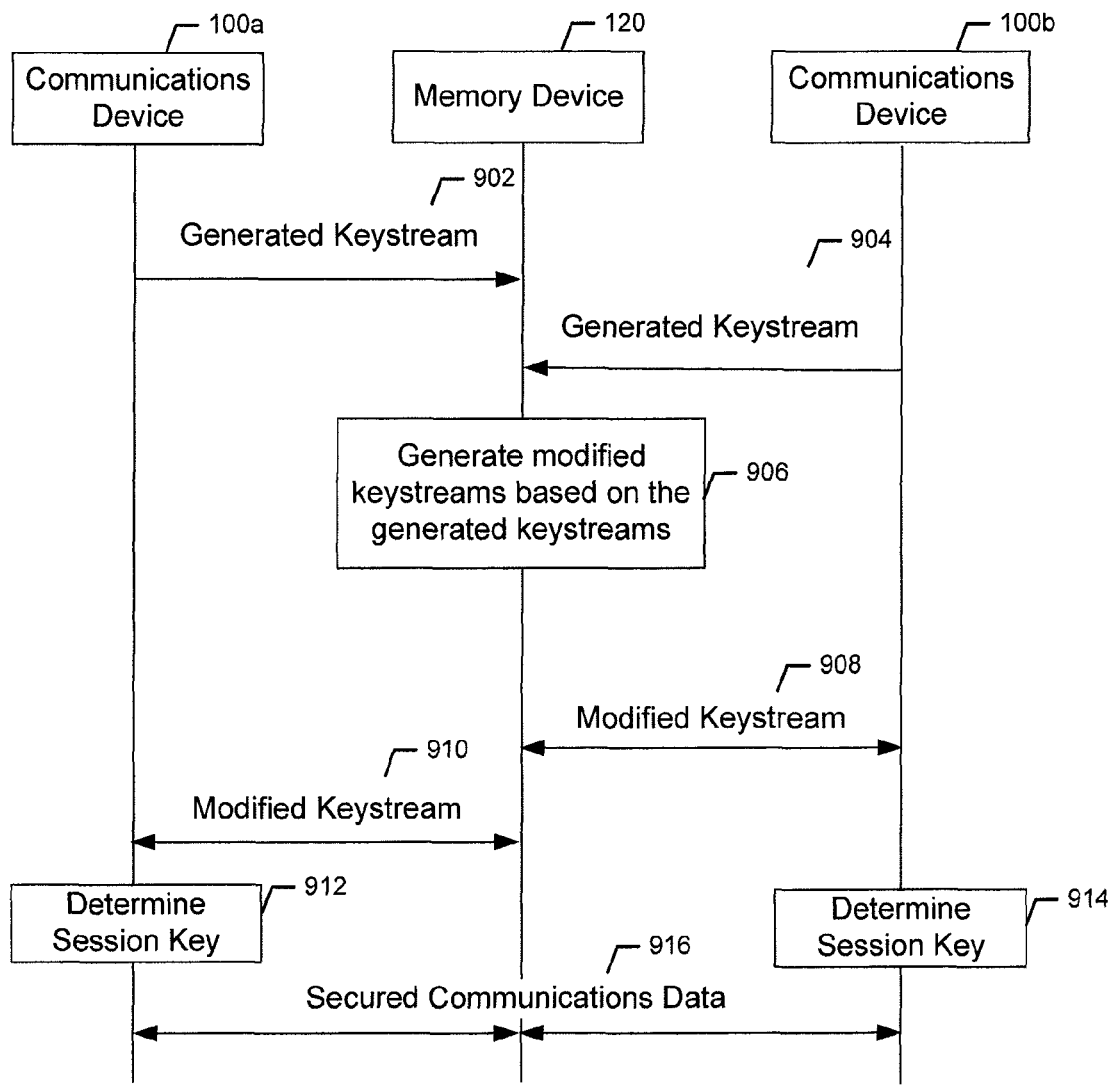

Having thus described some example embodiments in general terms, reference will now be made to the accompanying drawings, which are not necessarily drawn to scale, and wherein:

FIG. 1 illustrates an example distributed storage environment according to some example embodiments;

FIG. 2 illustrates an example keystream stored on a memory device in accordance with some example embodiments;

FIG. 3 illustrates an example modified keystream stored on a memory device in accordance with some example embodiments;

FIG. 4 illustrates an example session key generation method according to an example embodiment;

FIG. 5 illustrates a block diagram of an apparatus that is configured to implement keystream hierarchy in a distributed memory environment according to an example embodiment;

FIG. 6 illustrates a block diagram of a mobile device configured to implement keystream hierarchy in a distributed memory environment according to an example embodiment;

FIG. 7 illustrates a flow chart of an example method for implementing keystream hierarchy in a communications device according to some example embodiments;

FIG. 8 illustrates a flow chart of an example method for implementing keystream hierarchy in a memory device according to some example embodiments; and FIG. 9 illustrates a signaling flow diagram according to some example embodiments.

DETAILED DESCRIPTION

Example embodiments will now be described more fully hereinafter with reference to the accompanying drawings, in which some, but not all embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Further, the term "or" as used herein is not used in an exclusive manner (i.e., as an exclusive-or), but is defined as an operator that comprises at least one option in a collection, and possibly one or more other options within the collection.

As used herein, the term "circuitry" refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

FIG. 1 illustrates an example distributed storage environment 105 that comprises communications devices 100a, 100b and 100n and at least one memory device 120. The communications devices 100*a-n* may be embodied as any type of a user equipment (UE) (e.g., cell phone, mobile terminal, smart phone, reader, tablet or pad device, computer, or the like), or a component of a UE, that is configured to comprise computing and communications (e.g., close proximity wireless, including near field communications (NFC) and any other future higher speed close proximity connection) capabilities. Alternatively or additionally, both wireless powering (e.g. like NFC, UHF) and wireless communications (e.g. impulse UWB) may coexist in some embodiments.

The environment 105 may comprise one or more standalone memory devices that are embedded in communications devices 100*a-n* and memory devices that are not embedded or integrated into a communications device, such as an RF memory tag. In an instance in which the memory device is a standalone device, the example memory device 120 may comprise an integrated circuit (IC) and a memory. The memory may be configured to operate in an active or passive mode. Each memory device 120 may also implement an on-board or remote engine that manages and implements functionality that may be required for memory resources including, for example, logic updates, memory configuration, data logging management, and/or the like. The engines may be implemented in hardware and/or a combination of hardware and software. The engines, in some example embodiments, may be implemented by the ICs, respectively and may configure and maintain the configuration of the memories, may be implemented remotely, and may be configured to interface with the memory device 120 at various times to perform logic updates, tag and memory configuration, data logging management, and the like. The memory device 120 may be embodied as an active memory tag that comprises an internal power source for executing functionality, or a passive memory tag that relies upon the receipt of a powering signal to power the tag and perform functionality. According to various example embodiments, the memory device 120 may support wireless communications, including NFC, where, for example, there is one radio frequency for wireless power transfer (e.g., in NFC, ultra-high frequency (UHF), or the like) and the other for wireless data transfer (e.g., Impulse ultra-wideband (UWB)).

As described above, memory device 120 and systems that utilize memory device 120 may support an example smart space and/or similar environments. These environments may provide high data rate communications at 10-100 Mbit/s between devices (e.g., a reader/writer device and a memory device such as an RF memory tag). The memories of the tags may comprise large capacities (e.g., one or more Gigabits) operating over a very high data rate communication channel (e.g., impulse radio ultra wide band (UWB) at 7.9 GHz). A system or environment may be based on NFC and/or UHF, and the system or environment may enable smart spaces where a number of devices may use a shared view of resources and services. The smart spaces may, for example, provide a better user experience by allowing the user to introduce new devices to the network flexibly and to access some or all the information in the multi device system from any of the devices. As such, these technologies may combine high wireless access speeds to memory components with a high storage density, e.g., RF memory tags that may be embedded or standalone. These devices may be able to receive or send large amounts of data almost instantaneously by two devices "touching" or being in close proximity to each other for high bandwidth communications.

Through the operation of the embedded and standalone memory devices 120, the environment 105 may permit the implementation of shared memory resources. In this regard, for example, the communications devices 100*a-n* may store data (e.g. a file, a media object, an image, a communication, a data product and/or the like) on the memory device 120. To implement this type of resource sharing, a hierarchy of keystreams, key generation and key distribution may be implemented.

Accordingly, some example embodiments, methods and apparatuses are provided for implementing keystream hierarchy (e.g. in a distributed memory environment) that includes memory devices 120. To do so, various example embodiments enable a generated keystream, such as key streams 140*a*, 140*b* and 140*n*, to be stored on a memory device 120 in an instance in which a communications device 100*a-n* touches or is in close proximity to the memory device 120. As described herein, a memory device 120 may be any type of memory device, but is often implemented as non-volatile memories, and may be configured to operate in an active or passive mode. The memory device may also take the form of an RF memory tag that is embedded into a mobile communications device (also known as an etag) or may take the form of a standalone RF memory tag.

In some example embodiments, a keystream 140*a-n* may be generated for each communications device 100*a-n* that comes into communications range of the memory device 120. The keystream 140*a-n* may include a random or pseudo random stream of characters. Thus resulting in the memory device 120 having at least one, but in some example embodiments, more than one keystream 140*a-n* for each communications device 100*a-n* that has been in communications range of and/or touched the memory device 120. As is described herein, the environment 105 may include a plurality of memory devices 120 in a plurality of locations.

In various example embodiments, the memory device 120 may further be configured to modify a generated keystream by integrating two or more generated keystreams received from one or more communications devices 100*a-n*. For example, the modified keystream may be created by integrating (e.g. XOR) at least one session key for a first communications device 100*a*, an identification code of a second communications device 100*b* and at least one session key for the second communications device 100*b*.

In some example embodiments, the modified keystream may be further encrypted using a portion of the keystream generated by the first communications device 100*a* and/or the second communications device 100*b*. The modified keystream may be modified by each of the keystreams that are currently stored on the memory device 120 up to an index i, where i is the number of keystreams currently stored on the memory device 120. The resultant modified keystream may contain a shared secret (e.g. a key) between the first communications device 100*a* and the second communications device 100*b*. The memory device 120 may include i^2 keys, where a single key appears twice (e.g. once in each keystream for a pair of communications devices). The modified keystream then may be made available to any of the communications device 100*a-n* in an instance in which the communications device 100*a-n* touches (e.g. in communications range) the memory device 120. The modified keystream may be available to other communication devices, in some example embodiments. The modified keystream may be useful to an attacker in an instance in which the attacker also has the original generated keystream.

Using the modified keystream, the communications devices 100*a-n* are further configured to generate a session key using an XOR of the generated keystream and the modified keystream. In some example embodiments, communications device 100*a-n* may access the memory device 120 and further may cause a communication (e.g. a message, a file and/or the like) to be encrypted or integrity protected, using the session key or using a part of the session key, and stored on the memory device 120 for another communications device 100a-n, for example.

Alternatively or additionally, the memory device 120 may be attached and/or embedded in a communications device, such as communications devices 100a-n. In such cases, the memory device 120 may be operated by the communications device and may be used for device to device communications. In such cases the embedded memory tag may be powered by the communications device or may be self-powered.

FIGS. 2 and 3 illustrate example initialization and setup of a memory device 120 in an instance in which one or more communications devices, such as communications device 100a-n shown with reference to FIG. 1, touch a memory device 120. In some example embodiments and with reference to FIG. 2, a keystream may be generated for each communications device 100a-n that comes into communications range of the memory device 120. The keystream, such as keystream 140a, may be generated by a communications device the first time the communications device 100a and the memory device 120 touch and may contain a pseudo random string that is stored on the memory device 120. In some example embodiments, a keystream may be created for a communications device each time it touches a memory device. For example, the touching communications device may cause the keystream (keystream 1, with created keyID) to be created and it may be delivered to the recipient target device at first touch (at t=0).

In various example embodiments, a keystream may consist of an identification code 160 (e.g. medium access control (MAC) address, identification number and/or other identifying factor) and a random string (e.g. stochastic sequence). Both communications device 100a and communications device 100b may cause keystream to be stored on the memory device 120 with corresponding identification as shown by identification block 160. By way of example, communications device 100a may have an identification code of 76 and communications device 100b may have an identification code of 31.

In instance in which the communications device 100a touches the memory device 120 a subsequent time, a previously stored keystream may be updated and/or a new keystream may be added. For example, in an instance of a second touch (at t=T) by communications device 100a, a second keystream (keystream 2 with different keyID) may be created that provides a different keystream than the keystream that was created in first touch. A keystream may be updated, for example, in an instance in which the communications device 100a is interrupted (e.g. phone call) in the middle of the touch data streams. The keystream may also be updated in an instance in which a timer for a keystream has expired. A timer may be used to limit the duration a keystream is available. For example, after a predetermined time a previously generated keystream may be deleted and/or marked unusable and a new keystream may need to be generated.

In some example embodiments, the communications device, such as communications device 100a may be configured to automatically cause a generated keystream to be stored on any memory device 120. In other words, the communications device may cause the keystream to be generated and transferred to the memory device 120 without interaction by a user. Alternatively or additionally, in some example embodiments a user may cause the generation of the keystream, such as by interaction with the communications device 100a and/or the memory device 120. The generation of the keystream generally occurs on the communications device, although in some example embodiments the generation of a keystream may occur on the memory device.

In an instance in which communications device 100b touches the memory device 120, a keystream 140b may be caused to be transferred to the memory device 120. Once a memory device 120 has at least two keystreams the memory device, using the example IC, the memory device 120 may cause the two or more keystreams to be integrated by performing an update. The update may occur at a time when a new keystream is added (e.g. active memory device) or when the memory device is next activated (e.g. passive memory device).

Referring now to FIG. 3, in some example embodiments, the update may be performed between two keystreams, multiple keystreams belonging to two or more communications devices and/or between all keystreams stored in the memory device 120. The update may modify a slot of the keystream, such as a first identification slot 180a on keystream 150a or in alternative example embodiments it may update a subsequent unused identification slot. For example, in order to identify the resultant keystream as being linked to another communications device, such as communications device 100b, the first identifications slot 180a and the device identification code 170b of the keystream 150b may be integrated using an XOR. For example 1A→1A XOR 31→2B. Further the identification slot 190b of keystream 150b may also be updated (e.g. 82→82 XOR 76→F4). The resulting modified keystream comprises a new value that includes the identity of the communications device pair.

In some example embodiments, the key position, such as for example key positions 200a and 200b or the location of the session key is also updated. The key position 200a for keystream 150a and the key position 200b for keystream 150b may also be updated, by performing an XOR of the key positions 200a and 200b, the material block 220a and a material block 220b of the paired keystream. For example key position 200a of keystream 150a may be updated by 14→14 XOR A5 XOR 20→91 and key position 200b of keystream 150b may be updated FF→FF XOR A5 XOR 20→37A. Since key material blocks 220a and 220b were used, the key material block 220 may be zeroed so as to, for example, hide the key material block so that attackers cannot reverse engineer the original keystreams 140a and 140b.

In one example embodiment, the update of the keystream may include, but is not limited to the following implementation:

When a new Id{x+1} and keystream KS {x+1} is inserted:

---
for i = 1 to x
    KTS{i}[x+1][id] = KTS{i}[x+1][id] XOR Id{x+1}
    KTS{x+1}[i][id] = KTS{x+1}[i][id] XOR Id{i}
    KTS{i}[x+1][key] = KTS{i}[x+1][key] XOR KTS{i}[x+1][km]
    XOR KTS{x+1}[i][km]
    KTS{x+1}[i][key] = KTS{x+1}[i][key] XOR KTS{i}[x+1][km]
    XOR KTS{x+1}[i][km]
    KTS{i}[x+1][km] = 0
    KTS{x+1}[i][km] = 0
next i
where the size of one keystream slot (KTS) is len(Id) + 2 * len(key)

---

In some example embodiments, the modified keystream 150a and modified keystream 150b may optionally now be used by communications device 100a to encrypt/decrypt a communication for communications device 100b and vice versa. In some embodiments, the modified keystream 150a may be updated in an instance in which communications device 100a and/or communications device 100b touches the memory device 120. Alternatively or additionally, the modified keystream 150a and modified keystream 150b may also may be also used other security functions e.g. integrity protection, or both. For example, a first part of the modified keystream may be used for encryption/decryption and a second part of the modified keystream may be used for integrity protection.

After performing the update, the memory device 120, may be configured to make available a portion of a modified keystream such as, for example, after keystream 140a and keystream 140b have been combined as shown in FIG. 3, the memory device 120 may be configured to display the modified keystreams 150a and 150b based on an index value. The index value is common to the memory card device, and defines the border between readable and non-readable parts of the keystreams. Due to the way the pairwise key generation algorithm is defined in the default embodiment, the index may be common to all key streams, but may also be individual to a specific key stream with some other combination algorithm, such as index values 240a and 240b.

In some example embodiments, the modified portions of the keystreams may be made available, as the modified keystream may be meaningless without the original generated keystream. In some example embodiments the index value is adjusted by the memory device 120 in an instance in which a particular keystream has been modified.

Alternatively or additionally, in some example embodiments, communications device 100a and communications device 100b may be configured to communicate directly. For example based on the generated session key, in some embodiments, data may be encrypted and transmitted directly to another communications device without the use of a memory device. Alternatively or additionally, in an instance in which there is no pairing on a memory device between communications device 100a and communications device 100b, then a pairing may be created based on a historical touch by both the communications device 100a and communications device 100b with another memory device. An emergency pair may be created based on similarities between the first communications device 100a and a second communications device 100b. Alternatively or additionally, a session key may be created for one or more untouched devices that may be transferred in an instance in which such a device touches the memory device.

Alternatively or additionally, in an instance in which a first communications device 100a is attempting to transfer data to a second communications device 100b, communications device 100a and communications device 100b may attempt to determine if they share common keystream, such as a modified keystream on a memory device 120. In an instance in which they do share a keystream then that keystream may be used as a session key for security functions e.g. encryption of data and may be used even without the memory device 120. However in an instance in which there is not a common keystream between communications device 100a and communications device 100b, then communications device 100a may attempt to determine how many, if any, common keystream identifications for other communications devices are common between the two communications devices. In an instance in which, the number of common keystreams between communications device 100a and 100b exceeds a predetermined threshold, then communications device 100b may be considered to be trusted by communications device 100a thus enabling a modified keystream to be created that the communications device 100a and the communications device 100b both may understand.

Alternatively or additionally, the memory device 120 may be in communications with a server or other remote device. The memory device in these example embodiments, may be configured to communicate directly with a server, or may use an intermediate device, such as a communications device 100a-n to communicate with the server. In embodiments where the memory device is in communication with a server, the memory device 120 may download keystreams for a particular communication device, it may verify an identity of communications device and/or the like. In some example embodiments, the memory device may obtain identification information for a user of a communications device, such as from a social networking website.

FIG. 4 illustrates the operations performed by the example communications devices and memory device of some example embodiments of the current invention. When in operation, as described with reference to FIGS. 2 and 3 a keystream may be created and caused to be transmitted to be stored on a plurality of memory devices that are touched by the communications device. A portion of an example keystream created for communications device 100a is shown in keystream 302 and an example keystream created for communications device 100b is shown in example keystream 308. As is described with reference to FIGS. 2 and 3, a modified keystream 304 may then be created based on an XOR of keystream 302, the identification code of communications device 100b, for example 31, and keystream 308. Similarly, keystream 310 may be created based on an XOR of keystream 308, the identification code of communications device 100a, for example 76, and keystream 302. Keystream 304 and keystream 310 are similar to the keystreams generated and shown with respect to FIG. 3.

In some example embodiments and in an instance in which communications device 100a attempts to cause an encrypted communication to be stored on the memory device 120 for communications device 100b, the communications device 100a may XOR keystream 302 with the modified keystream 304 to discover the session key 314, shown in keystream 306, for communications device 100b as identified by identification code, for example an identification code 76. The communications directed to communications device 100b may be encrypted using the session key, for example the session key 85. As is shown in FIG. 3, communications device 100b may obtain the same session key 316, shown in keystream 312, to decrypt the communications by computing the XOR of keystream 308 and keystream 310.

Having described some example embodiments above, FIGS. 5 and 6 depict example apparatuses that may be configured to perform various functionalities as described herein, including those described with respect to FIGS. 1 through 4 and the associated text. Additionally, FIGS. 7 and 8 illustrate an example method or algorithm that may be performed by the apparatuses of FIGS. 5 and 6 that incorporates the various features and functionalities described herein.

Referring now to FIG. 5, an example embodiment is depicted as apparatus 500, which may be embodied as an electronic device, such as a standalone or embedded RF memory tag. In some example embodiments, the apparatus 500 may be part of a mobile electronic device such as the communications devices 100a-n, or the memory device 120. As a mobile device, the apparatus 500 may be part of a mobile and/or wireless communications node such as, for example, a mobile and/or wireless server, computer, access point, handheld wireless device (e.g., telephone, tablet/pad device, portable digital assistant (PDA), mobile television, gaming device, camera, video recorder, audio/video player, radio, digital book reader, and/or a global positioning system (GPS)

device), a wireless memory tag, any combination of the aforementioned, or the like. Regardless of the type of electronic device, apparatus 500 may also comprise computing capabilities.

FIG. 5 illustrates a block diagram of example apparatus 500, which may comprise or be otherwise in communication with various components including, but not limited to a processor 505, a memory device 510, an Input/Output (I/O) interface 506, a communications interface 515, and a keystream manager 540. The processor 505, which may be embodied as an IC, may, according to some example embodiments, be embodied as various means for implementing the various functionalities of example embodiments including, for example, a microprocessor, a coprocessor, a controller, a special-purpose integrated circuit such as, for example, an ASIC (application specific integrated circuit), an FPGA (field programmable gate array), or a hardware accelerator, processing circuitry or the like. According to one example embodiment, processor 505 may be representative of a plurality of processors, or one or more multiple core processors, operating in concert. Further, the processor 505 may be comprised of a plurality of transistors, logic gates, a clock (e.g., oscillator), other circuitry, and the like to facilitate performance of the functionality described herein. The processor 505 may, but need not, comprise one or more accompanying digital signal processors. In some example embodiments, the processor 505 may be configured to execute instructions stored in the memory device 510 or instructions otherwise accessible to the processor 505. The processor 505 may be configured to operate such that the processor causes or directs the apparatus 500 to perform various functionalities described herein.

Whether configured as hardware or via instructions stored on a computer-readable storage medium, or by a combination thereof, the processor 505 may be an entity and means capable of performing operations according to example embodiments while configured accordingly. Thus, in example embodiments where the processor 505 is embodied as, or is part of, an ASIC, FPGA, or the like, the processor 505 may be specifically configured hardware for conducting the operations described herein and the algorithms described herein. Alternatively, in example embodiments where the processor 505 is embodied as an executor of instructions stored on a computer-readable storage medium, the instructions may specifically configure the processor 505 to perform the algorithms and operations described herein. In some example embodiments, the processor 505 may be a processor of a specific device (e.g., mobile communications device) configured for employing example embodiments by further configuration of the processor 505 via executed instructions for performing the algorithms, methods, and operations described herein.

The memory device 510 may be one or more tangible and/or non-transitory computer-readable storage media that may comprise volatile and/or non-volatile memory. In some example embodiments, the memory device 510 comprises Random Access Memory (RAM) including dynamic and/or static RAM, on-chip or off-chip cache memory, and/or the like. Further, memory device 510 may comprise non-volatile memory, which may be embedded and/or removable, and may comprise, for example, read-only memory, flash memory, magnetic storage devices (e.g., hard disks, floppy disk drives, magnetic tape, etc.), optical disc drives and/or media, non-volatile random access memory (NVRAM), various type of solid-state storage (e.g., flash memory), and/or the like. Memory device 510 may comprise a cache area for temporary storage of data. In this regard, some or all of memory device 510 may be comprised within the processor 505. In some example embodiments, the memory device 510 may be in communication with the processor 505 and/or other components via a shared bus. In some example embodiments, the memory device 510 may be configured to provide secure storage of data, such as, for example, the characteristics of the reference marks, in trusted modules of the memory device 510.

Further, the memory device 510 may be configured to store information, data, applications, computer-readable program code instructions and algorithms, and/or the like for enabling the processor 505 and the example apparatus 500 to carry out various functions in accordance with example embodiments described herein. For example, the memory device 510 may be configured to buffer input data for processing by the processor 505. Additionally, or alternatively, the memory device 510 may be configured to store instructions for execution by the processor 505.

The I/O interface 506 may be any device, circuitry, or means embodied in hardware or a combination of hardware and software that is configured to interface the processor 505 with other circuitry or devices, such as the user interface 525. In some example embodiments, the I/O interface may embody or be in communication with a bus that is shared by multiple components. In some example embodiments, the processor 505 may interface with the memory 510 via the I/O interface 506. The I/O interface 506 may be configured to convert signals and data into a form that may be interpreted by the processor 505. The I/O interface 506 may also perform buffering of inputs and outputs to support the operation of the processor 505. According to some example embodiments, the processor 505 and the I/O interface 506 may be combined onto a single chip or integrated circuit configured to perform, or cause the apparatus 500 to perform, various functionalities.

In some embodiments, the apparatus 500 or some of the components of apparatus 500 (e.g., the processor 505 and the memory device 510) may be embodied as a chip or chip set. In other words, the apparatus 500 may comprise one or more physical packages (e.g., chips) including materials, components and/or wires on a structural assembly (e.g., a baseboard). The structural assembly may provide physical strength, conservation of size, and/or limitation of electrical interaction for component circuitry comprised thereon. The apparatus 500 may therefore, in some cases, be configured to implement embodiments on a single chip or as a single "system on a chip." As such, in some cases, a chip or chipset may constitute means for performing the functionalities described herein and with respect to the processor 505.

The communication interface 515 may be any device or means (e.g., circuitry) embodied in hardware, a computer program product, or a combination of hardware and a computer program product that is configured to receive and/or transmit data from/to a network, including, but not limited to a smart space or similar RF memory tag environment and/or any other device or module in communication with the example apparatus 500. The communications interface 515 may be configured to communicate information via any type of wired or wireless connection, and via any type of communications protocol, such as a communications protocol that supports cellular communications or near field communications. According to various example embodiments, the communication interface 515 may be configured to support the transmission and reception of communications in a variety of networks including, but not limited to Internet Protocol-based networks (e.g., the Internet), cellular networks, or the like. Further, the communications interface 515 may be configured to support device-to-device communications, such as in a mobile ad hoc network (MANET). Processor 505 may also be configured to facilitate communications via the communications interface 515 by, for example, controlling hardware comprised within the communications interface 515. In this regard, the communication interface 515 may comprise, for example, communications driver circuitry (e.g., circuitry that supports wired communications via, for example, fiber optic connections), one or more antennas, a transmitter, a receiver, a transceiver and/or supporting hardware, including, for example, a processor for enabling communications. Via the communication interface 515, the example apparatus 500 may communicate with various other network entities in a device-to-device fashion and/or via indirect communications via a base station, node B, enhanced node B, access point, server, gateway, router, or the like.

The keystream manager 540 of example apparatus 500 may be any means or device embodied, partially or wholly, in hardware, a computer program product, or a combination of hardware and a computer program product, such as processor 505 implementing stored instructions to configure the example apparatus 500, memory device 510 storing executable program code instructions configured to carry out the functions described herein, or a hardware configured processor 505 that is configured to carry out the functions of the keystream manager 540 as described herein. In some example embodiments, the keystream manager 540 may be configured to implement the functionality described with respect to the engines and the ICs of the memory device 120 of FIG. 1. In an example embodiment, the processor 505 comprises, or controls, the keystream manager 540. The keystream manager 540 may be, partially or wholly, embodied as processors similar to, but separate from processor 505. In this regard, the keystream manager 540 may be in communication with the processor 505. In various example embodiments, the keystream manager 540 may, partially or wholly, reside on differing apparatuses such that some or all of the functionality of the keystream manager 540 may be performed by a first apparatus, and the remainder of the functionality of the keystream manager 540 may be performed by one or more other apparatuses. For example the keystream apparatus of a communications device may cause a keystream to be created and/or manipulated, whereas the keystream manager 540 of a memory device 120 may be configured to perform integration of various keystreams.

Further, the apparatus 500 and the processor 505 may be configured to perform various functionalities via keystream manager 540. In this regard, the keystream manager 540 may be configured to implement some or all of the operations and functionality described herein. For example, the keystream manager 540 may be configured to implement the functionality described above with respect to FIGS. 1 through 4, and otherwise described above. Further, according to some example embodiments, the keystream manager 540 may be configured to perform the operations described in FIGS. 7 and 8 and described variations thereof.

In this regard, referring to FIG. 7, the keystream manager 540, when embodied by an example communications device, may be configured to cause, at 700, a generated keystream to be transmitted to a memory device in an instance in which a first device is in radio communications range of the memory device. At 710, the keystream manager 540 may be configured to cause the generated modified keystream to be accessed on or received from a memory device in an instance in which the memory device is in radio communications range, and, at 720, the keystream manager 540 may be configured to determine a session key based on the generated keystream and the modified keystream. In some example embodiments, the modified keystream is created by the memory device based on the generated keystream and a keystream received by the memory device from a second device. Further, the keystream manager 540 may be configured to, at 730, cause communication data (e.g. integrity protected data and/or decrypted data) to be transmitted to the memory device or the second device. In various example embodiments, the communications data is protected using at least part of the session key and is intended for the second device. Alternatively or additionally, in some example embodiments the keystream manager 540 may be configured to cause the secured communications data to be transmitted directly to the second device.

The a keystream manager 540 may also be configured to determine, at 740, another session key for the first device and a third device based on a prior connection by the first device and the third device with the memory device. Finally, at 750, the keystream manager 540 may be configured to enable, based on another session key, the first device to communicate with the third device in an instance in which the first device and the third device are in radio communications range.

Referring to FIG. 8, the keystream manager 540, when embodied by an example memory device, may be configured to receive, at 800, a first generated keystream in an instance in which a first device is in radio communications range and at 810, the keystream manager 540 may be configured to receive a second generated keystream in an instance in which a second device is in radio communications range. Further, the keystream manager 540 may be configured to, at 820, generate a first modified keystream based on an identification indicator of the second device and the first generated keystream and at 830 to generate a second modified keystream based on an identification indicator of the first device and the second generated keystream.

Referring now to FIG. 6, a more specific example apparatus in accordance with various embodiments of the present invention is provided. The example apparatus of FIG. 6 is a mobile terminal 10 configured to communicate within a wireless network, such as a cellular communications network, which may include a memory device such as an eTAG 32. The mobile terminal 10 may be configured to perform the functionality of the communications devices 100*a-n*, the memory device 120, and/or the apparatus 500 as described herein via the etag 32. The etag 32 may communicate with the processor 20 via an internal, wired communication channel or via RF communications with the antenna 12. More specifically, the mobile terminal 10 may be caused to perform the functionality described with respect to FIGS. 1-4, and/or 7-9, via the processor 20. In this regard, according to some example embodiments, the processor 20 may be configured to perform the functionality described with respect to the keystream manager 540. Processor 20 may be an integrated circuit or chip configured similar to the processor 505 together with, for example, the I/O interface 506. Further, volatile memory 40 and non-volatile memory 42 may be configured to support the operation of the processor 20 as computer readable storage media. In some example embodiments the etag 32 may contain an antenna portion and a memory portion, in such example embodiments, the etag 32 may be configured to communicate independently from the mobile terminal 10. Alternatively or additionally, the mobile terminal 10 may function as an etag.

The mobile terminal 10 may also comprise an antenna 12, a transmitter 14, and a receiver 16, which may be comprised as parts of a communications interface of the mobile terminal 10. Alternatively or additionally, in some embodiments the mobile terminal 10 may comprises additional antennas and/or wireless radio devices so as to enable wireless powering and data transfer to a remote memory tag, such as a passive or batteryless memory tag. The speaker 24, the microphone 26, display 28 (which may be a touch screen display), and the keypad 30 may be comprised as parts of a user interface.

By way of example and with reference to the signaling flow diagram of FIG. 9, two or more communications devices such as communications devices 100*a* and 100*b* may be configured to be communicated in a secured manner using a memory device 120. In accordance with some example embodiments of the invention and in an instance in which communications device 100*a* touches or is in communications range of memory device 120, the communications device 100*a* may generate a keystream and cause the generated keystream to be transmitted to the memory device 120. See signal 902. Similarly in an instance in which communications device 100*b* is in communications range of the memory device 120, communications device 100*b* may generate a keystream and cause the generated keystream to be transmitted to the memory device 120. See signal 904.

In some example embodiments and in an instance in which two or more generated keystreams are received, the memory device 120 may be configured, at operation 906, to modify the received generated keystreams. Some example methods of modifying the keystreams are shown and described with reference to FIGS. 2-4, 7 and 8. In an instance in which a communications device, such as communications device 100*a* and/or 100*b* are in communications range of the memory device 120, the communications device 100*a* and/or 100*b* may access and/or receive the modified keystream. See signals 908 and 910.

In some example embodiments, the communications devices 100*a* and/or 100*b* may determine a session key based on the generated and modified keystreams at operations 912 and/or 914. The session key may be configured for secured communications between communications device 100*a* and communications device 100*b*. In an instance in which communications device 100*a* and/or communications device 100*b* may attempt to transfer communications data, then at least part of the determined session key may be used to secure the communications data. The communications data secured by at least part of the session key then may be transmitted to the memory device 120 and/or may be communicated directly between communications device 100*a* and communications device 100*b*.

FIGS. 2-4, and 7-9 illustrate flowcharts or processes of example systems, methods, and/or computer program products according to example embodiments. It will be understood that each operation of the flowcharts, and/or combinations of operations in the flowcharts, can be implemented by various means. Means for implementing the operations of the flowcharts, combinations of the operations in the flowchart, or other functionality of example embodiments described herein may comprise hardware, and/or a computer program product including a computer-readable storage medium (as opposed to a computer-readable transmission medium which describes a propagating signal) having one or more computer program code instructions, program instructions, or executable computer-readable program code instructions stored therein. In this regard, program code instructions for performing the operations and functions of 2-4, and 7-9 and otherwise described herein may be stored on a memory device, such as memory device 510, volatile memory 40, or non-volatile memory 42, of an example apparatus, such as example apparatus 500 or communications devices 100*a-n*, and executed by a processor, such as the processor 505 or processor 20. As will be appreciated, any such program code instructions may be loaded onto a computer or other programmable apparatus (e.g., processor 505, memory device 510, or the like) from a computer-readable storage medium to produce a particular machine, such that the particular machine becomes a means for implementing the functions specified in the flowcharts' operations. These program code instructions may also be stored in a computer-readable storage medium that can direct a computer, a processor, or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the flowcharts' operations. The program code instructions may be retrieved from a computer-readable storage medium and loaded into a computer, processor, or other programmable apparatus to configure the computer, processor, or other programmable apparatus to execute operations to be performed on or by the computer, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor, or other programmable apparatus provide operations for implementing the functions specified in the flowcharts' operations.

Accordingly, execution of instructions associated with the operations of the flowchart by a processor, or storage of instructions associated with the blocks or operations of the flowcharts in a computer-readable storage medium, support combinations of operations for performing the specified functions. It will also be understood that one or more operations of the flowcharts, and combinations of blocks or operations in the flowcharts, may be implemented by special purpose hardware-based computer systems and/or processors which perform the specified functions, or combinations of special purpose hardware and program code instructions.

Advantageously, and in accordance with some example embodiments of the current invention, two or more members of a team may be able to exchange secure data using an unsecure memory tag. For example, the team members may be working in one or more rooms that comprise memory tags for temporary storage and retrieval. These members of the team, in accordance with the description of some example embodiments described herein, may have determined one or more session keys between the members of the team. Thus, in an instance in which the members of the team are in an unsecure location, the team members may transfer data via an non-secure RF memory tag or other memory device using the previously developed session keys without, for example, the danger of an attacker accessing the data.

Advantageously, and in accordance with some example embodiments of the current invention, a communications device may be configured to communicate data, that is secured using at least part of a determined session key, to an RF memory tag that is integrated with a ticketing system (e.g mass transit), a financial system (e.g. automated teller machines, financial transactions between users), a payments system, a point of sale system and/or the like. Such uses may, for example, advantageously allow for the exchange of private, financial or other secure data between a communications device and another communications device or RF memory tag.

Many modifications and other embodiments set forth herein will come to mind to one skilled in the art to which these embodiments pertain having the benefit of the teachings presented in the foregoing descriptions and the associated drawings. Therefore, it is to be understood that the embodiments are not to be limited to the specific ones disclosed and that modifications and other embodiments are intended to be comprised within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. A method comprising:
    accessing a modified keystream on a memory device, wherein the modified keystream is created by the memory device based on a generated keystream and a keystream received by the memory device from a second device;
    determining, via a processor, a session key based on the generated keystream and the modified keystream, wherein the generated keystream was previously transmitted to the memory device in an instance in which the memory device was in radio communications range;
    transmitting communications data to the memory device or to the second device, wherein the communications data is protected using at least a portion of the session key and is intended for the second device;
    determining a second session key based on a second generated keystream and a second modified keystream; wherein the second modified keystream is created by the memory device based on the second generated keystream and a keystream received by the memory device from a third device; and
    transmitting communications data to the memory device, wherein the communications data is secured using the second session key and is intended for the third device.

2. The method according to claim 1, further comprising causing the generated keystream to be transmitted to a memory device in an instance in which the memory device is in radio communications range.

3. The method according to claim 1, wherein at least a portion of the session key is accessible on the memory device, wherein the portion of the session key that is readable is determined by an index value on the memory device.

4. The method according to claim 1, further comprising:
    causing another generated keystream to be transmitted to the memory device in an instance in which the memory device is again in radio communications range;
    determining an updated session key based on the generated keystream, the another generated keystream and a modified keystream; and
    causing communications data to be transmitted to the memory device or to the second device, wherein the communications data is protected using the session key and is intended for the second device.

5. The method according to claim 1 wherein the modified keystream is created based on an XOR of the generated keystream, the keystream of the second device and an identification code of the second device.

6. The method according to claim 1, further comprising determining a session key based on an XOR of the generated keystream and the modified keystream.

7. The method according to claim 1 wherein the second device comprises a radio frequency memory card embedded in a communications device.

8. An apparatus comprising:
    at least one processor; and
    at least one memory including computer program code, the at least one memory and the computer program code configured to, with the at least one processor, cause the apparatus to at least:
    access a generated keystream on a memory device, wherein the generated keystream was created in an instance in which the memory device was in radio communications range;
    determine a session key based on the generated keystream and a modified keystream; wherein the modified keystream is created by the memory device based on the generated keystream and a keystream received by the memory device from a second device; and
    transmit communications data to the memory device or to the second device, wherein the communications data is protected using at least a portion of the session key and is intended for the second device;
    determine another session key based on a generated keystream and a modified keystream; wherein the modified keystream is created by the memory device based on the generated keystream and a keystream received by the memory device from a third device; and
    transmit communications data to the memory device or to the second device, wherein the communications data is protected using the another session key and is intended for the third device.

9. An apparatus according to claim 8, wherein the at least one memory including the computer program code is further configured to, with the at least one processor, cause the apparatus to cause a generated keystream to be transmitted to a memory device in an instance in which the memory device is in radio communications range.

10. An apparatus according to claim 8, wherein at least a portion of the session key is accessible on the memory device, wherein the portion of the session key that is readable is determined by an index value on the memory device.

11. An apparatus according to claim 8, wherein the at least one memory including the computer program code is further configured to, with the at least one processor, cause the apparatus to:
    cause another generated keystream to be transmitted to the memory device in an instance in which the memory device is again in radio communications range;
    determine an updated session key based on the generated keystream, the another generated keystream and a modified keystream; and
    cause communications data to be transmitted to the memory device or to the second device, wherein the communications data is protected using the session key and is intended for the second device.

12. An apparatus according to claim 8 wherein the modified keystream is created based on an XOR of the generated keystream, the keystream of the second device and an identification code of the second device.

13. An apparatus according to claim 8, wherein the at least one memory including the computer program code is further configured to, with the at least one processor, cause the apparatus to determine a session key based on an XOR of the generated keystream and the modified keystream.

14. An apparatus according to claim 8 wherein the second device comprises a radio frequency memory card embedded in a communications device.

15. A method comprising:
   receiving, at a memory device, a first generated keystream in an instance in which a first device is in radio communications range;
   receiving, at the memory device, a second generated keystream in an instance in which a second device is in radio communications range;
   generating a first modified keystream based on an identification indicator of the second device and the first generated keystream; and
   generating a second modified keystream based on an identification indicator of the first device and the second generated keystream;
   receiving encrypted data from the first device, wherein the encrypted data is encrypted using a session key that was generated by the first device based on the first generated keystream and the first modified keystream; and
   receiving encrypted data from the second device, wherein the encrypted data is encrypted using a second session key that was generated by the second device based on the second generated keystream and the second modified keystream.

16. The method according to claim 15 further comprising modifying an index value in an instance in which at least one of the first modified keystream or the second modified keystream is generated, wherein the index value indicates a portion of at least one of the first generated keystream or the second generated keystream that is accessible by at least one device.

17. A The method according to claim 15 further comprising:
   receiving a third generated keystream in an instance in which a third device is in radio communications range;
   generating a third modified keystream based on an identification indicator of the second device and the second generated keystream; and
   generating a fourth modified keystream based on an identification indicator of the first device and the first generated keystream.

* * * * *

UNITED STATES PATENT AND TRADEMARK OFFICE
CERTIFICATE OF CORRECTION

PATENT NO. : 9,203,609 B2  
APPLICATION NO. : 13/316932  
DATED : December 1, 2015  
INVENTOR(S) : Ekberg et al.

Page 1 of 1

It is certified that error appears in the above-identified patent and that said Letters Patent is hereby corrected as shown below:

In the claims:

Column 20,  
Line 11, "A The method" should read --The method--.

Signed and Sealed this  
Twenty-eighth Day of June, 2016

Michelle K. Lee  
*Director of the United States Patent and Trademark Office*